United States Patent
Yamamoto et al.

(10) Patent No.: US 8,675,876 B2
(45) Date of Patent: Mar. 18, 2014

(54) DIFFERENTIAL PHASE SHIFT KEYING QUANTUM KEY DISTRIBUTION

(75) Inventors: Yoshihisa Yamamoto, Stanford, CA (US); Eleni Diamanti, Paris (FR); Edo Waks, Gaithersburg, MD (US); Kyo Inoue, Tokyo (JP); Hiroki Takesue, Kanagawa (JP); Toshimori Honjo, Kanagawa (JP)

(73) Assignees: The Board of Trustees of the Leland Stanford Junior University, Palo Alto, CA (US); NTT Corporation, Kanagawa ( * ) Notice: Subject to any disclaimer, the term of this patent is extended or adjusted under 35 U.S.C. 154(b) by 1133 days.

(21) Appl. No.: 12/084,197

(22) PCT Filed: Nov. 4, 2005

(86) PCT No.: PCT/US2005/040428
§ 371 (c)(1),
(2), (4) Date: Oct. 5, 2009

(87) PCT Pub. No.: WO2007/055683
PCT Pub. Date: May 18, 2007

(65) Prior Publication Data
US 2010/0034390 A1      Feb. 11, 2010

(51) Int. Cl.
*H04L 9/08* (2006.01)
(52) U.S. Cl.
USPC .......................................... 380/278
(58) Field of Classification Search
USPC ........................... 380/278–279, 44, 255–256
See application file for complete search history.

(56) References Cited

U.S. PATENT DOCUMENTS

| | | |
|---|---|---|
| 6,188,768 B1 | 2/2001 | Bethune et al. |
| 2005/0094818 A1 | 5/2005 | Inoue et al. |
| 2005/0152540 A1 | 7/2005 | Barbosa |
| 2008/0130888 A1* | 6/2008 | Trifonov et al. ............... 380/256 |

OTHER PUBLICATIONS

H. Takesue et al., Differential phase shift quantum key distribution experiment over 105 km fibre, Quantum Physics, Jul. 12, 2005.*
Inoue, K., Waks, E. & Yamamoto, Y., "Differential Phase Shift Quantum Key Distribution", Jul. 15, 2002, pp. 1-3, Physical Review Letters 89 (3).
Inoue, K., Waks, E. & Yamamoto, Y., "Differential-phase-shift quantum key distribution using coherent light", 2003, pp. 1-3, Physical Review A 68, 022317.
Zhou, C., Wu, G., Chen, X. & Zeng, H., "'Plug and play' quantum key distribution system with differential phase shift", Sep. 1, 2003, pp. 1692-1694, Applied Physics Letters, vol. 83, No. 9.

(Continued)

*Primary Examiner* — Eleni Shiferaw
*Assistant Examiner* — Jing Sims
(74) *Attorney, Agent, or Firm* — Lumen Patent Firm

(57) ABSTRACT

Differential phase shift (DPS) quantum key distribution (QKD) is provided, where the average number of photons per transmitted pulse is predetermined such that the secure key generation rate is maximal or nearly maximal, given other system parameters. These parameters include detector quantum efficiency, channel transmittance and pulse spacing (or clock rate). Additional system parameters that can optionally be included in the optimization include baseline error rate, sifted key error rate, detector dead time, detector dark count rate, and error correction algorithm performance factor. The security analysis leading to these results is based on consideration of a hybrid beam splitter and intercept-resend attack.

14 Claims, 3 Drawing Sheets

(56) References Cited

OTHER PUBLICATIONS

Chen, X., Zhou, C., Wu, G. & Zeng, H., "Efficient quantum key distribution with stable and expansible differential phase shift schemes", Aug. 30, 2004, pp. 1648-1650, Applied Physics Letters, vol. 85, No. 9.

Honjo, T. & Inoue, K., "Differential-phase-shift Quantum Key Distribution", Dec. 2004, pp. 26-33, NTT Technical Review, vol. 2, No. 12.

* cited by examiner

DIFFERENTIAL PHASE SHIFT KEYING QUANTUM KEY DISTRIBUTION

CROSS-REFERENCE TO RELATED APPLICATIONS

This application is a 371 of PCT Patent Application PCT/US2005/040428 filed Nov. 4, 2005.

FIELD OF THE INVENTION

This invention relates to quantum key distribution for cryptography.

BACKGROUND

The use of a one time pad protocol based on a shared secret key is of special interest in cryptography, since it can provide unbreakable encryption. However, messages encrypted with this protocol can be decrypted by anyone in possession of the key, so the protocol vulnerability depends on the security of key distribution. It is helpful to formulate the key distribution problem in the following standard manner. Alice and Bob communicate with each other via a channel. An eavesdropper Eve has full access to the channel. Eve can receive, tap and/or intercept signals from Alice and Bob, and can also send signals to Alice and Bob. Signals between Alice and Bob can include key information and/or encrypted messages.

Quantum key distribution (QKD) is of special significance, since it can provide provably secure key distribution over a compromised channel. The main idea of quantum key distribution is that Eve's actions in monitoring signals from Alice and Bob cannot be performed without modifying these signals. In other words, an "undetectable tap" does not physically exist. This perturbation of the signals is a quantum-mechanical effect, and key distribution protocols based on various kinds of quantum states have been proposed. Examples include the use of entangled states, non-orthogonal states, orthogonal states (U.S. Pat. No. 6,188,768), and states from single-photon sources (US 2005/0094818). The various QKD methods differ significantly in terms of their performance (as measured by secure key distribution rate) and their technical requirements (which affect cost). In fact, US 2005/0152540 proposes a hybrid key distribution scheme to use a short key (distributed by a slow QKD method) to provide fast and secure key distribution.

For simplicity, it is preferable to employ a QKD method that can directly provide fast and secure key distribution without excessive cost (e.g., preparation of exotic quantum states). A promising approach is differential phase shift (DPS) QKD, which was proposed in connection with a single photon source by Inoue et al., Phys. Rev. Lett., 89(3), 037902, 2002. DPS QKD was extended to pulses from a coherent source by Inoue et al. in Phys. Rev. A, 68, 022317, 2003. Although these references indicate that DPS QKD can outperform conventional QKD protocols such as BB84 and B92, a full security analysis of DPS QKD is not provided in this work. Without such an analysis, it is not clear how to maximize (or nearly maximize) the secure key distribution rate for DPS QKD given various system parameters (e.g., transmission loss, detector efficiency, etc.).

Accordingly, it would be an advance in the art to provide DPS QKD that can be tailored to maximize (or nearly maximize) the secure key distribution rate.

SUMMARY

The present invention addresses this need by providing DPS QKD where the average number of photons per transmitted pulse is predetermined such that the secure key generation rate is maximal or nearly maximal, given other system parameters. These parameters include detector quantum efficiency, channel transmittance and pulse spacing (or clock rate). Additional system parameters that can optionally be included in the optimization include baseline error rate, sifted key error rate, detector dead time, detector dark count rate, and error correction algorithm performance factor. The security analysis leading to these results is based on consideration of a hybrid beam splitter and intercept-resend attack.

DETAILED DESCRIPTION

Figure 1:
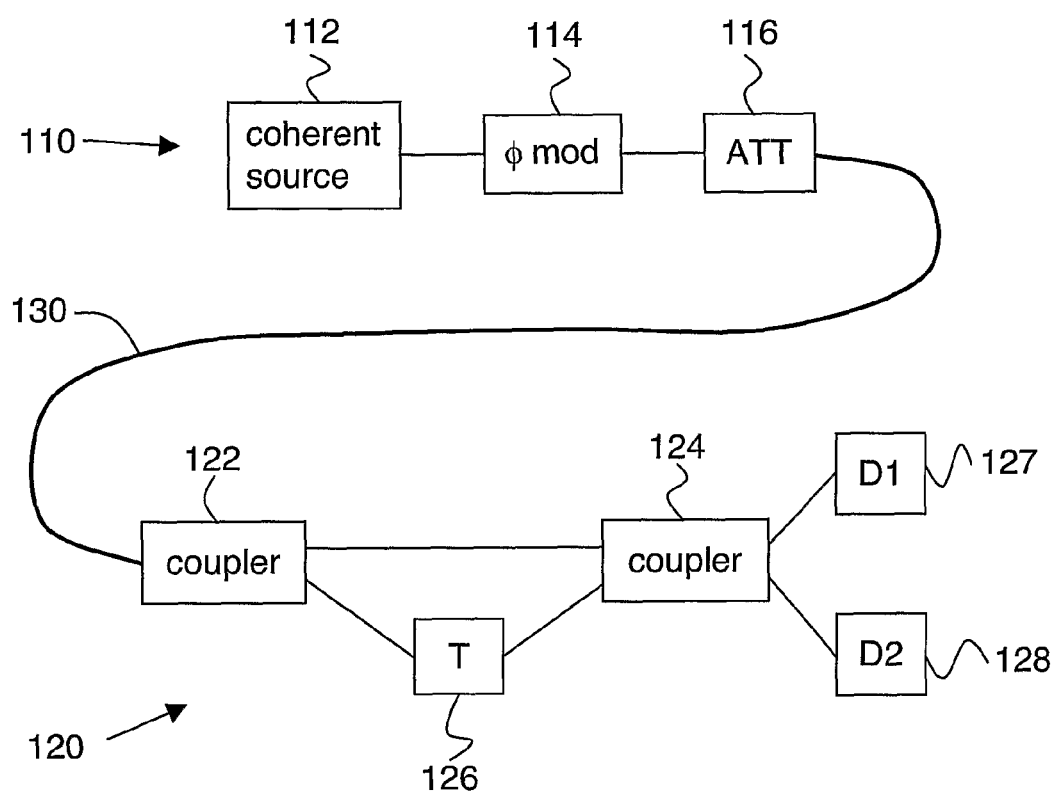
FIG. 1 shows a QKD system according to an embodiment of the invention.

FIG. 1 shows a QKD system according to an embodiment of the invention. The system of FIG. 1 has a transmitter 110 (Alice) in communication with a receiver 120 (Bob) over a channel 130. As indicated above, an eavesdropper (Eve) is assumed to have full access to channel 130. Transmitter 110 includes a source of coherent light 112, a phase modulator 114 and an attenuator 116. Source 112 emits pulses of coherent light having a pulse spacing (or period) T. The use of coherent light (as opposed to more exotic quantum states such as single-photon or entangled states) is an advantage of the invention. Source 112 can be a pulsed laser, or it can be a CW laser having an intensity modulator at its output to form pulses, or it can be any other source that provides pulses of coherent radiation.

In operation, phase modulator 114 is driven such that each pair of time-adjacent pulses is either substantially in phase or substantially out of phase after modulation. This can be accomplished by randomly driving phase modulator 114 to provide phase shifts of 0 and $\pi$ (or of any two phases separated by $\pi$). Alice makes a record of the modulation applied to each pulse, for use in a later step of the protocol.

The purpose of attenuator 116 is to adjust the output pulse intensity such that the average number of photons per pulse $\mu$ is a predetermined value less than unity. The selection of $\mu$ is an important aspect of the invention, and will be considered in greater detail below. Broadly speaking, $\mu$ is the main parameter to vary in order to maximize the secure key generation rate. If $\mu$ is too small, the key generation rate will be very low because few photons are transmitted. If $\mu$ is too large, the secure key generation rate can decrease because Eve's attacks become more effective. Thus the selection of an optimal or near-optimal $\mu$ depends on a detailed analysis of the protocol and of various possible attacks Eve can attempt.

Channel 130 can include free space and/or any medium (e.g., optical fiber) suitable for transmission of radiation. The channel transmittance $\alpha$ is a key system parameter. By definition $\alpha$, is a power transmittance, so $\alpha=1$ corresponds to no loss and $\alpha=0.1$ if 10% of the transmitted power makes it to the receiver. Optical losses in the receiver prior to detection can also be included in the $\alpha$ parameter.

In the receiver, an interferometer is formed by couplers 122 and 124 and a time delay element 126. Time delay element 126 provides a time delay of T (the pulse spacing). Such interferometers will be referred to as T-delay interferometers in the following description. The interferometer can be fabricated with planar lightwave technology (e.g., an unbalanced waveguide Mach-Zehnder interferometer). Any other approach for providing an interferometer having a time delay of T is also suitable for practicing the invention. The T-delay interferometer has two outputs connected to detectors 127 and 128 (D1 and D2). If two adjacent pulses are in phase, the demodulated pulse will appear at one of the two detectors (e.g., D1), and if two adjacent pulses are out of phase, the demodulated pulse will appear at the other of the two detectors (e.g., D2). The roles of D1 and D2 can be reversed in other embodiments of the invention.

Important detector parameters include quantum efficiency $\eta$, dead time $t_d$, and dark count rate d. The quantum efficiency is the probability of detecting a single incident photon, and the dead time is the time period immediately following detection of an input during which the detector cannot respond to a second input. The dark count rate is the rate at which the detector erroneously "detects" photons when no signal light is incident. Modeling real detectors in terms of $\eta$, $t_d$ and d is an approximation which simplifies analysis and retains the important physics. Further simplification can be performed in some cases by neglecting the effect of d and/or $t_d$. In general, detectors D1 and D2 can have different quantum efficiencies $\eta_1$ and $\eta_2$ respectively, but it is preferred for the detectors to have the same quantum efficiency $\eta$ and for this quantum efficiency to be as high as possible.

Any device capable of detecting photons can be used for detectors D1 and D2. Suitable devices include photodiodes, avalanche photodiodes, photomultiplier tubes, upconversion detectors, superconducting transition edge sensors, and solid state photomultipliers.

Figure 2:
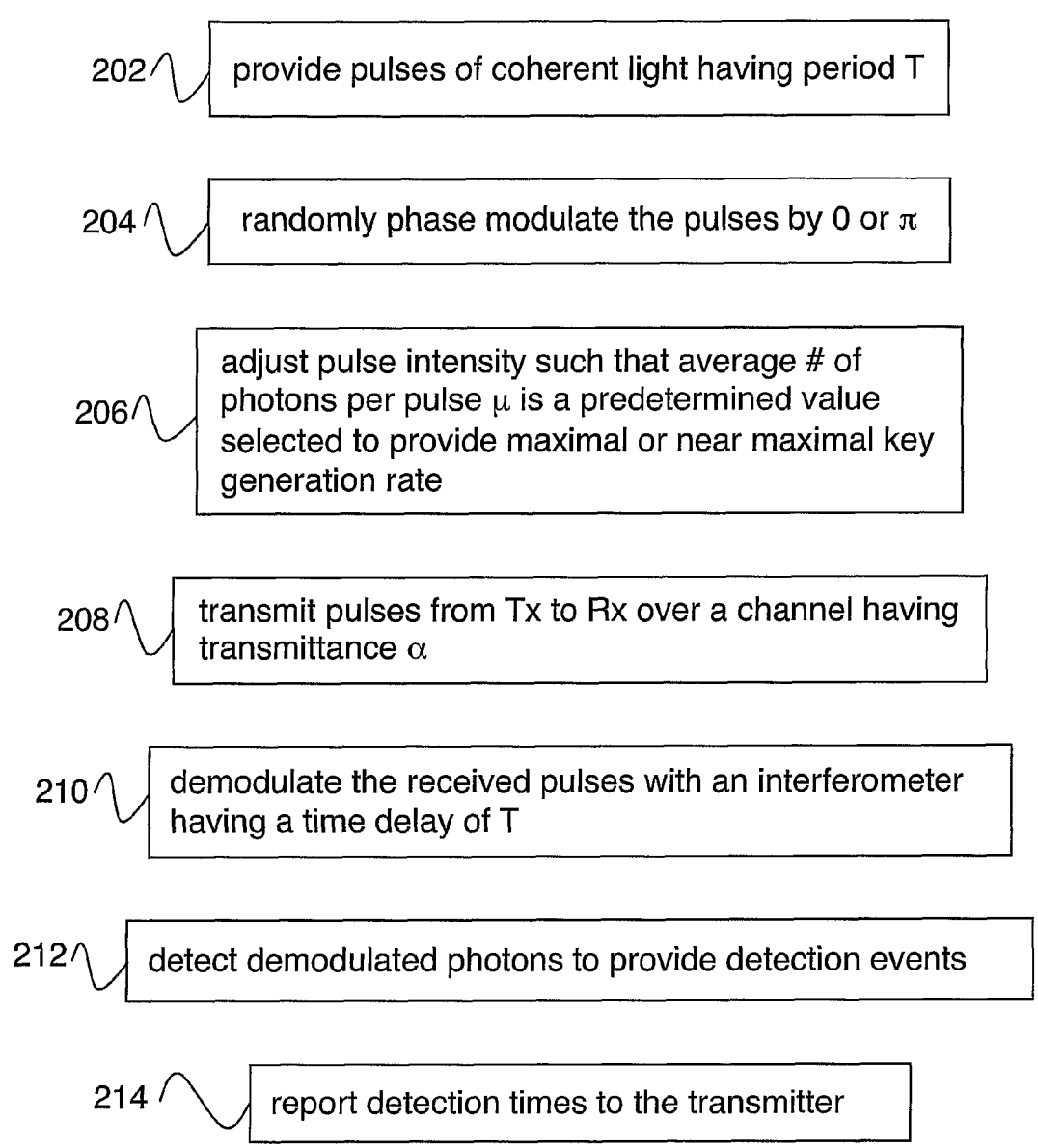
FIG. 2 shows a QKD method according to an embodiment of the invention.

FIG. 2 shows steps of a QKD method according to an embodiment of the invention. Step 202 is providing pulses of coherent light having a pulse spacing T (e.g., with source 112). Step 204 is randomly phase modulating the pulses (e.g., with modulator 114). Step 206 is adjusting the average number of photons per pulse $\mu$ to provide maximal or near-maximal secure key generation rate (e.g., with attenuator 116). Step 208 is transmitting the pulses from Alice to Bob over a channel (e.g., channel 130) having a transmittance $\alpha$. Step 210 is demodulating the received pulses with a T-delay interferometer. Step 212 is detecting the demodulated pulses to provide detection events. As indicated above, one of the detectors will only receive light when two adjacent pulses are in phase, and the other detector will only receive light when the two adjacent pulses are out of phase.

Step 214 is reporting the detection events to the transmitter. More specifically, the times at which photons are detected are reported to Alice by Bob. Since Alice has made a record of the modulation applied to each pulse, she can deduce from the detection event times which detector provided each detection event. Alice will need to synchronize her modulation record to the detection event times reported by Bob. Methods for performing such synchronization are well known in the art. The end result of this procedure is that Alice and Bob have shared a key. More specifically, let a detection event from detector D1 be a "0" and a detection event from detector D2 be a "1" (or vice versa). The sequence of 0s and 1s corresponding to the detection times reported by Bob is the key. Bob knows this information directly, and Alice deduces it from the detection event times and her modulation record.

It is clear that the above protocol allows Alice and Bob to share an identical key. Furthermore, any attack by Eve will need to be relatively sophisticated, since the readily available information (i.e., the pulses and the detection times) does not suffice to reconstruct the key.

The following security analysis is based on consideration of two possible attacks by Eve. The first attack is based on using a beam splitter (BS) to tap the channel. The second attack is an intercept-resend (I-R) attack, where Eve intercepts pulses from Alice and sends pulses to Bob. These two attacks can be implemented together as a hybrid BS and I-R attack. As is customary in security analyses, the only limits imposed on Eve's snooping are fundamental quantum-mechanical limits. More specifically, it is assumed that Eve can replace the real channel having transmittance $\alpha$ with a lossless channel and replace Bob's real detectors having quantum efficiency $\eta<1$ with ideal detectors having $\eta=1$.

To set up the problem, it is assumed that prior to Eve's interference, the channel transmittance is $\alpha$, the average number of photons per pulse is $\mu$, both of Bob's detectors have a quantum efficiency of $\eta$, and the coherence time of Alice's source is NT, where T is the pulse to pulse spacing. Thus the average photon number detected by Bob is $\mu N\alpha\eta$, while the average photon number transmitted by Alice is $\mu N$. Eve receives $\mu N$ photons and splits off $\mu N\alpha\eta$ photons with a beam splitter for transmission to Bob (using the lossless channel and ideal detectors) to duplicate the innocent channel loss. The remaining $\mu N(1-\alpha\eta)$ photons are available to Eve for attacking the key.

Eve can demodulate her photons with the same kind of receiver as Bob and obtain her sequence of detection events. However, Eve's detection events will only occasionally coincide with the detection events reported by Bob (even after synchronizing both sequences to the same time origin). The probability of a coincidence is $\mu(1-\alpha\eta)$, since Eve's detection of a photon can occur at any time within the coherence time, which is spread out over N pulse intervals.

Eve can improve her odds by storing her photons in a quantum memory. Once Bob announces the times at which detection events occur, Eve then demodulates the stored photons with the same kind of receiver as Bob. The probability of a coincidence is $2\mu(1-\alpha\eta)$. The factor of two improvement arises because Eve is assumed to gate her interferometer with an optical switch to only operate at desired times (i.e., the detection event times reported by Bob). Since Bob's announcement of the detection times can be delayed arbitrarily, Eve's quantum memory is assumed to have whatever coherence time is required.

For any detection event where Eve's detection time coincides with Bob's reported time, Eve knows the associated bit of the key. Thus in a sifted key having $n_{sif}$ bits, Eve knows $2\mu n_{sif}(1-\alpha\eta)$ bits. This mutual information between Eve and Bob is independent of $\alpha$ and $\eta$ for $\alpha\eta<<1$, and decreases as $\mu$ decreases.

Eve can also implement an I-R attack by taking advantage of innocent system bit errors. Eve further splits some photons from the $\mu N\alpha\eta$ photons allocated for transmission to Bob by Eve. Eve measures the phase differences of these intercepted photons in a T-delay interferometer. Detection of these photons by Eve leads to a sequence of interception events. For each interception event, Eve transmits a single photon to Bob which is split into two time slots in a T-delay interferometer. The relative phase between the two time slots of the resent photon is set to 0 or $\pi$ according to Eve's measurement results. When this fake photon is received by Bob, it can be detected at three possible times: t1<t2<t3. The time t1 relates to taking the shorter path in both interferometers (Eve's and Bob's), the time t3 relates to taking the longer path in both interferometers, and the time t2 relates to taking the longer path in one interferometer and the shorter path in the other interferometer. The probabilities of detection at t1, t2, and t3 are ¼, ½, and ¼ respectively.

If Bob detects the fake photon at times t1 or t3, there is no correlation between the phase modulation applied by Alice and which of Bob's detectors detects the fake photon. If Bob detects the fake photon at time t2, the proper correlation will occur between the phase modulation applied by Alice and which of Bob's detectors detects the fake photon. Thus Eve's I-R attack introduces errors in the key. In an ideal case where the innocent error rate is zero, this I-R attack can be discovered by monitoring the error rate in the key and attributing any finite error rate to eavesdropping.

A more practical situation is where the system used by Alice and Bob provides a nonzero innocent error rate e in the sifted key bits. It is assumed that Eve can substitute a perfect system having zero error rate for this real system. Eve can then perform her I-R attack undetectably, provided the error rate induced by the I-R attack is e (so that Alice and Bob do not notice any difference in error rate). In a sifted key having $n_{sif}$ bits, Eve can attack $4en_{sif}$ bits, since each fake photon introduces an error with probability ¼. Since ½ of the fake photons are detected at t2, Eve knows $2en_{sif}$ bits of the key as a result of the I-R attack.

Based on the preceding considerations, the collision probability $p_c$ between bits owned by Bob and Eve is given by $$p_c = 2^{-n_{sif}(1-2\mu(1-\alpha\eta)-2e)}, \quad (1)$$

where both the beam splitter and intercept-resend attacks are accounted for. The privacy amplification compression factor $\tau_1$ is given by $$\tau_1 = 1 + \frac{\log_2 p_c}{n_{sif}}. \quad (2)$$

Assuming error correction and privacy amplification, the secure key generation rate $R_s$ is given by $$R_s = R_{ng}[1 - \tau_1 + f(e)(e\log_2 e + (1-e)\log_2(1-e))] \quad (3)$$
$$= R_{ng}[1 - 2\mu(1-\alpha\eta) - 2e + f(e)(e\log_2 e + (1-e)\log_2(1-e))]$$

where $R_{ng}$ is the sifted key generation rate and $f(e) \geq 1$ characterizes the performance of the error correction algorithm. The factor $f(e)=1$ is the ideal limiting case where the number of error correction bits is equal to the Shannon limit. This factor is known as a function of e for various error correction algorithms, and is typically between 1 and about 1.5.

The sifted key generation rate $R_{ng}$ is given by $$R_{ng} = \left(\frac{\mu\alpha\eta + 2d}{T}\right)\exp\left(-\frac{(\mu\alpha\eta + 2d)t_d}{2T}\right) \quad (4)$$

where d is the detector dark count rate and $t_d$ is the detector dead time. As indicated above, the error rate e is the error rate in the sifted key bits. This error rate is given by $$e = \frac{b\mu\alpha\eta + d}{\mu\alpha\eta + 2d}, \quad (5)$$

where b is the system baseline error rate. The baseline error rate b is the system-level photon error rate and includes the effects of various system non-idealities (e.g., imperfect state preparation, channel noise, alignment errors, imperfect detectors, etc.). If the dark count rate is negligible, then e and b are approximately the same.

Based on this analytical framework, near optimal quantum key distribution can be provided in the following manner. The system parameters $\eta$, $\alpha$, d, $t_d$, T and b are assumed to be given. The given quantities also include f(e), since the error correction algorithm being employed is a given, and f(e) depends only on this algorithm. From Eqs. 3-5, the secure key generation rate $R_s(\mu)$ is known as a function of $\mu$, the average number of photons per pulse. Since the secure key generation rate goes to zero for both very small $\mu$ (i.e., $\mu\alpha\eta \ll d$) and for large $\mu$ (i.e., $\mu > \frac{1}{2}$), the secure key generation rate takes on a maximum value $R_{max}$ at an optimal average number of photons per bit $\mu_{opt}$ (i.e., $R_s(\mu_{opt})=R_{max}$). Preferably, $\mu$ is predetermined such that $R_s(\mu)$ is greater than about 0.5 $R_{max}$, and more preferably, $\mu$ is predetermined such that $R_s(\mu)$ is greater than about 0.8 $R_{max}$.

The above analysis relates to a preferred embodiment of the invention. Other embodiments of the invention can be obtained by various modifications to the above analysis. For example, if the dark count rate d is negligible, the sifted key generation rate is given approximately by $R_{ng}=(\mu\alpha\eta/T)\exp(-\mu\alpha\eta t_d/2T)$, and the sifted key error rate e is about equal to b. If the sifted key error rate e is negligible, the secure key generation rate is given approximately by $R_s=R_{ng}(1-2\mu(1-\alpha\eta))$. In cases where either (or both) of these approximations are valid, the optimization for $\mu$ can be based on the appropriately simplified expression for $R_s(\mu)$. The analysis can be expressed in various mathematically equivalent forms, all of which are included in the invention. For example, the above equations can be expressed in terms of the system clock rate f=1/T.

Other modifications of the analysis relate to the capabilities assumed for Eve. For example, if Eve is not assumed to have access to a quantum memory having arbitrary coherence time, then the collision probability is given by $p_c=2^{-n_{sif}(1-2\mu(1-\alpha\eta)-2e)}$, which leads to corresponding changes in the remainder of the analysis. Similarly, if Eve is not assumed to be able to replace Bob's detectors with perfect detector (without alerting Bob), the collision probability is given by $p_c=2^{-n_{sif}(1-2\mu(1-\alpha\eta)-2e)}$, which also leads to corresponding changes in the remainder of the analysis.

Figure 3:
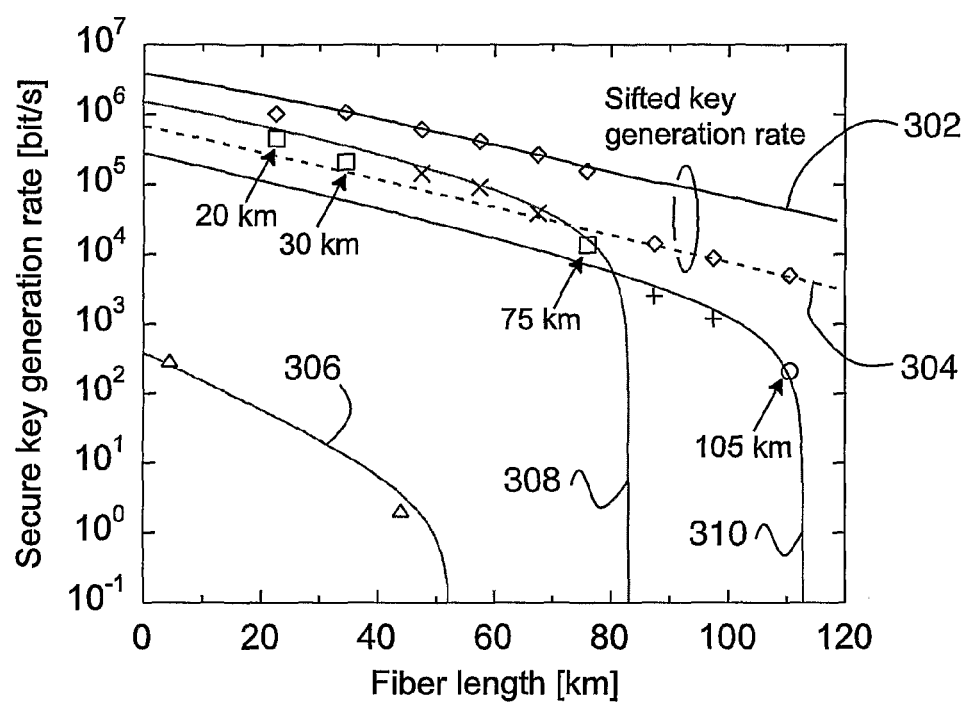
FIG. 3 is a comparison of experimental and calculated key generation rates for various QKD methods, including some embodiments of the invention.

FIG. 3 is a comparison of experimental and calculated key generation rates for various QKD methods, including some embodiments of the invention. Secure key generation rate is plotted as a function of fiber length for various cases. The fiber is assumed to have a loss of 0.2 dB/km and the baseline error rate b is assumed to be 3%. In these experiments, Alice's transmitter is an external cavity semiconductor laser having a LiNbO$_3$ intensity modulator at its output to provide pulses having a spacing T=1 ns. The pulse width is 100 ps. Attenuation as described above to optimize $\mu$ is performed at the transmitter. The resulting optimal values of $\mu$ are in the range from about 0.16 to about 0.18, depending on system parameters. The T-delay interferometer in Bob's receiver is a planar lightwave circuit having an insertion loss of 2.5 dB.

The following DPS QKD results are obtained with up-conversion detectors, where nonlinear mixing in a periodically poled lithium niobate waveguide between the received photons at 1560 nm and a strong pump wave at 1319 nm generates sum frequency photons at 715 nm. The internal conversion efficiency between 1560 nm photons and 715 nm photons exceeds 99%. The 715 nm photons are detected with a single photon counting module (SPCM) based on a silicon avalanche photodiode, which has a high quantum efficiency (about 70%), a low dark count rate (about 50 Hz) and a dead time of 50 ns. The overall quantum efficiency of the up-conversion detector can be varied by changing the 1319 nm pump power, and can be as high as 37%. However, a spurious nonlinear interaction in the waveguide occurred, so the detector dark count rate increased quadratically as the pump power increased. It can be beneficial to accept a lower quantum efficiency in order to reduce the dark count rate in certain cases. Time gating (i.e., applying a time window to the recorded data before processing it) is employed to reduce the effect of detector timing jitter.

The squares show experimental DPS QKD results using fiber transmission, while the x marks show experimental DPS QKD results using an attenuator to simulate fiber loss. These results were obtained with the upconversion detectors set to have $\eta=8.8\%$. The time window was 0.6 ns, and the resulting dark count rate was 26 kHz. In each case, the average number of photons per bit is optimized as described above to maximize $R_s$. Line 308 on FIG. 3 shows the calculated $R_{max}$ as a function of fiber length for these cases, and excellent agreement is seen between theory and experiment. The sifted key generation rate for $\eta=8.8\%$ is shown as line 302. Experimental data points are the result of averaging the results of five individual runs. At fiber lengths of 30 km or less, the sifted key generation rate exceeded 1 Mbit/s. The secure key generation rate over 20 km of fiber was 0.455 Mbit/s.

The circle shows an experimental DPS QKD result using fiber transmission, while the +marks show experimental DPS QKD results using an attenuator to simulate fiber loss. These results were obtained with the upconversion detectors set to have $\eta=2.0\%$. The time window was 0.2 ns, and the resulting dark count rate was 2.7 kHz. In each case, the average number of photons per bit is optimized as described above to maximize $R_s$. Line 310 on FIG. 3 shows the calculated $R_{max}$ as a function of fiber length for these cases, and excellent agreement is seen between theory and experiment. The sifted key generation rate for $\eta=2.0\%$ is shown as line 304. Experimental data points are the result of averaging the results of five individual runs. Here the secure key generation rate was 209 bit/s at a distance of 100 km.

The triangles show experimental QKD results using the conventional BB84 QKD protocol with InGaAs avalanche photodiode detectors and a Poissonian light source. The security analysis for this case considers a photon number splitting (PNS) attack. Line 306 is a corresponding theoretical calculation of the BB84 secure key generation rate. The DPS QKD results (both key generation rate and distance) are significantly better than the BB84 results. Further improvement in the demonstrated performance of DPS QKD can be obtained by reducing the detector dark count rate (e.g., by eliminating the spurious nonlinear interaction) and/or by reducing detector timing jitter. In view of these possibilities for improvement, DPS QKD should be able to provide secure QKD over distances as large as 300 km.

The invention claimed is:

1. A method for quantum key distribution comprising:
    a) providing pulses of coherent light having a time spacing T between adjacent pulses at a transmitter;
    b) phase modulating the pulses randomly at the transmitter such that each adjacent pair of pulses is either in phase or out of phase, wherein the modulation applied to each pulse is recorded to provide modulation times;
    c) adjusting the intensity of the pulses such that an average number of photons per transmitted pulse is a predetermined value $\mu$ less than unity;
    d) transmitting the pulses from the transmitter to a receiver over a channel having a transmittance $\alpha$;
    e) demodulating the received pulses by passing them through a two arm interferometer having a time delay difference equal to T, wherein the interferometer has two outputs (O1 and O2), each output having a corresponding detector (D1 and D2);
    f) detecting demodulated pulses with the detectors to provide detection events, each detection event having a detection time, wherein detectors D1 and D2 have quantum efficiencies $\eta_1$ and $\eta_2$ respectively;
    g) providing the detection times to the transmitter;
    i) comparing the detection times to the modulation times to deduce at the transmitter which of the detectors in the receiver is associated with each of the detection events;
    wherein a secure key generation rate $R_s$ is a predetermined function of at least $\mu$, $\alpha$, $\eta_1$ and $\eta_2$;
    wherein $R_s$ takes on a maximum value $R_{max}$ for an optimal average number of photons per bit $\mu_{opt}$;
    wherein $\mu$ is predetermined such that $R_s$ is greater than about 0.5 $R_{max}$.

2. The method of claim 1, wherein $\mu$ is predetermined such that $R_s$ is greater than about 0.8 $R_{max}$.

3. The method of claim 1, wherein said detectors have equal quantum efficiency $\eta$.

4. The method of claim 3, wherein $t_d$ is a dead time of said detectors and wherein a sifted key generation rate $R_{ng}$ is given by $R_{ng}=(\mu\alpha\eta/T)\exp(-\mu\alpha\eta t_d/2T)$.

5. The method of claim 4, wherein said predetermined function is given by $R_s=R_{ng}(1-2\mu(1-\alpha\eta))$.

6. The method of claim 3, wherein said detectors have a dark count rate d and wherein $R_s$ is a predetermined function of at least $\mu$, $\alpha$, $\eta$ and d.

7. The method of claim 6, wherein $t_d$ is a dead time of said detectors and wherein a sifted key generation rate $R_{ng}$ is given by $R_{ng}=((\mu\alpha\eta+2d)/T)\exp(-(\mu\alpha\eta+2d)t_d/2T)$.

8. The method of claim 7 wherein said predetermined function is given by $R_s=R_{ng}(1-2\mu(1-\alpha\eta))$.

9. The method of claim 7 wherein said system provides a baseline error rate b and wherein a sifted key error rate e is given by $$e = \frac{b\mu\alpha\eta + d}{\mu\alpha\eta + 2d}.$$

10. The method of claim 9, wherein an error correcting algorithm provides a correction factor f(e) to the Shannon limit, and wherein said predetermined function is given by $R_s=R_{ng}(1-2\mu(1-\alpha\eta)-2e+f(e)\{e\log_2 e+(1-e)\log_2(1-e)\})$.

11. A system for quantum key distribution comprising:
    a) a source of coherent light pulses in a transmitter, wherein a time spacing between adjacent pulses is T;
    b) a phase modulator in the transmitter and capable of modulating the pulses such that each adjacent pair of pulses is either in phase or out of phase, wherein the modulation applied to each pulse is recorded to provide modulation times;
    c) an intensity adjuster in the transmitter and capable of adjusting the intensity of the pulses such that an average number of photons per transmitted pulse is a predetermined value $\mu$ less than unity;
    d) a channel having a transmittance $\alpha$ on which the pulses are transmitted from the transmitter to a receiver;
    e) a two arm interferometer in the receiver having a time delay difference equal to T and having two outputs (O1 and O2), wherein the interferometer is capable of receiving the pulses from the channel and providing demodulated pulses at outputs O1 and O2;

f) two detectors (D1 and D2) coupled to outputs O1 and O2 respectively, wherein detectors D1 and D2 have quantum efficiencies $\eta_1$ and $\eta_2$ respectively;

wherein the demodulated pulses are detected by the detectors to provide detection events, each detection event having a detection time;

wherein the detection times are provided to the transmitter;

wherein the detection times are compared to the modulation times to deduce at the transmitter which of the detectors in the receiver is associated with each of the detection events;

wherein a secure key generation rate $R_s$ is a predetermined function of at least $\mu$, $\alpha$, $\eta_1$ and $\eta_2$;

wherein $R_s$ takes on a maximum value $R_{max}$ for an optimal average number of photons per bit $\mu_{opt}$;

wherein $\mu$ is predetermined such that $R_s$ is greater than about $0.5\ R_{max}$.

12. The system of claim 11, wherein said channel includes an optical fiber.

13. The system of claim 11, wherein said detectors are selected from the group consisting of photodiodes, avalanche photodiodes, photomultiplier tubes, upconversion detectors, superconducting transition edge sensors, and solid state photomultipliers.

14. The system of claim 11, wherein said coherent light is provided by an optical source selected from the group consisting of a pulsed laser and a CW laser combined with an optical modulator.

* * * * *